US012240231B2

(12) United States Patent
Linn et al.

(10) Patent No.: US 12,240,231 B2
(45) Date of Patent: Mar. 4, 2025

(54) INTEGRATED CIRCUIT WITH ADDRESS DRIVERS FOR FLUIDIC DIE

(71) Applicant: HEWLETT-PACKARD DEVELOPMENT COMPANY, L.P., Spring, TX (US)

(72) Inventors: Scott A. Linn, Corvallis, OR (US); James Michael Gardner, Corvallis, OR (US); Michael W. Cumbie, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 108 days.

(21) Appl. No.: 17/989,354

(22) Filed: Nov. 17, 2022

(65) Prior Publication Data

US 2023/0081336 A1 Mar. 16, 2023

Related U.S. Application Data

(63) Continuation of application No. 16/768,023, filed as application No. PCT/US2019/016818 on Feb. 6, 2019, now Pat. No. 11,559,985.

(51) Int. Cl.
*B41J 2/045* (2006.01)

(52) U.S. Cl.
CPC ....... *B41J 2/04541* (2013.01); *B41J 2/04586* (2013.01)

(58) Field of Classification Search
CPC ................ B41J 2/04588; B41J 2/04541; B41J 2/04586
See application file for complete search history.

(56) References Cited

U.S. PATENT DOCUMENTS 4,026,402 A 5/1977 Byrd
4,872,028 A 10/1989 Lloyd
(Continued)

FOREIGN PATENT DOCUMENTS

CN 1727186 A 2/2006
CN 1922019 A 2/2007
(Continued)

OTHER PUBLICATIONS

"Four-Terminal Sensing." Wikipedia: The Free Encyclopedia. Wikimedia Foundation Inc., retrieved at https://en.wikipedia.org/wiki/Four-terminal_sensing, Sep. 16, 2018, 3 pages.
(Continued)

*Primary Examiner* — Lam S Nguyen
(74) *Attorney, Agent, or Firm* — Foley & Lardner LLP

(57) ABSTRACT

A fluidic die including an array of fluid actuating devices addressable by a set of addresses, and an array of memory elements including a first portion to receive a first set of address bits representative of a first portion of an address of the set of addresses, and a second portion to receive a second set of address bits representative of a second portion of the address of the set of addresses. A first address driver is to provide a first portion of the address of the set of addresses based on the first set of address bits received by the first portion of memory elements, and a second address driver is to provide a remaining portion of the address of the set of addresses based on a second set of address bits received by the second portion of memory elements.

14 Claims, 8 Drawing Sheets

(56) References Cited

U.S. PATENT DOCUMENTS

| | | | |
|---|---|---|---|
| 5,422,662 | A | 6/1995 | Fukushima et al. |
| 5,541,629 | A | 7/1996 | Saunders et al. |
| 5,751,302 | A | 5/1998 | Rezanka |
| 5,917,509 | A | 6/1999 | Becerra et al. |
| 6,176,569 | B1 | 1/2001 | Anderson et al. |
| 6,302,507 | B1 | 10/2001 | Prakash et al. |
| 6,547,356 | B2 | 4/2003 | Edelen et al. |
| 6,616,256 | B1 | 9/2003 | Cook et al. |
| 6,698,862 | B1 | 3/2004 | Choi et al. |
| 7,104,624 | B2 | 9/2006 | Schloeman et al. |
| 7,159,959 | B2 | 1/2007 | Schremp |
| 7,252,353 | B2 | 8/2007 | Silverbrook et al. |
| 7,266,661 | B2 | 9/2007 | Walmsley |
| 7,267,417 | B2 | 9/2007 | Silverbrook et al. |
| 7,419,236 | B2 | 9/2008 | Masuda |
| 7,578,569 | B2 | 8/2009 | Silverbrook |
| 7,738,137 | B2 | 6/2010 | Graf et al. |
| 7,758,141 | B2 | 7/2010 | Sakurai |
| 7,832,842 | B2 | 11/2010 | Jackson Pulver et al. |
| 7,866,778 | B2 | 1/2011 | Silverbrook et al. |
| 7,976,115 | B2 | 7/2011 | Gibson et al. |
| 8,199,342 | B2 | 6/2012 | Martin |
| 8,348,373 | B2 | 1/2013 | Martin et al. |
| 8,353,567 | B1 | 1/2013 | Banerjee et al. |
| 8,556,364 | B2 | 10/2013 | Hoisington et al. |
| 8,777,364 | B2 | 7/2014 | Carrobe et al. |
| 8,864,260 | B1 | 10/2014 | Ge et al. |
| 9,415,585 | B1 | 8/2016 | Goyen et al. |
| 9,597,894 | B2 | 3/2017 | Buxton et al. |
| 9,776,395 | B2 | 10/2017 | Anderson et al. |
| 10,821,735 | B2 * | 11/2020 | Anderson ............ B41J 2/04555 |
| 11,364,719 | B2 | 6/2022 | Gardner et al. |
| 11,407,218 | B2 | 8/2022 | Rossi et al. |
| 11,413,862 | B2 | 8/2022 | Linn et al. |
| 11,485,134 | B2 | 11/2022 | Rossi et al. |
| 11,559,985 | B2 | 1/2023 | Linn et al. |
| 2003/0063297 | A1 | 4/2003 | Dodd |
| 2004/0104973 | A1 | 6/2004 | Huang et al. |
| 2004/0183842 | A1 | 9/2004 | Kobayashi et al. |
| 2005/0110814 | A1 | 5/2005 | Imai |
| 2005/0190217 | A1 | 9/2005 | Wade et al. |
| 2005/0206944 | A1 | 9/2005 | Walmsley et al. |
| 2006/0050100 | A1 | 3/2006 | Kondoh et al. |
| 2006/0092437 | A1 | 5/2006 | Martin |
| 2006/0109296 | A1 | 5/2006 | Shamoun et al. |
| 2006/0132518 | A1 | 6/2006 | Jackson Pulver et al. |
| 2006/0139380 | A1 | 6/2006 | Walmsley et al. |
| 2006/0181558 | A1 | 8/2006 | Walmsley et al. |
| 2007/0095928 | A1 | 5/2007 | Balinsky et al. |
| 2007/0126769 | A1 | 6/2007 | Usui |
| 2007/0177169 | A1 | 8/2007 | Han |
| 2007/0296743 | A1 | 12/2007 | Sakurai |
| 2008/0036804 | A1 | 2/2008 | Sakurai |
| 2008/0123641 | A1 | 5/2008 | Park |
| 2008/0238969 | A1 * | 10/2008 | Kasai ................... B41J 2/04588 347/61 |
| 2008/0303868 | A1 | 12/2008 | Sakurai |
| 2009/0009545 | A1 | 1/2009 | Takei et al. |
| 2009/0278879 | A1 | 11/2009 | Takeuchi et al. |
| 2009/0278890 | A1 | 11/2009 | Yamaguchi et al. |
| 2010/0124329 | A1 | 5/2010 | Lyman |
| 2010/0156992 | A1 | 6/2010 | Xie et al. |
| 2013/0063511 | A1 | 3/2013 | Gardner et al. |
| 2013/0257949 | A1 | 10/2013 | Qiu et al. |
| 2014/0078223 | A1 | 3/2014 | Ohmura |
| 2014/0111570 | A1 | 4/2014 | Nitta et al. |
| 2014/0320558 | A1 | 10/2014 | Ge et al. |
| 2015/0124019 | A1 | 5/2015 | Cruz-Uribe et al. |
| 2015/0266324 | A1 | 9/2015 | Qu et al. |
| 2016/0089885 | A1 | 3/2016 | Edelen et al. |
| 2017/0239944 | A1 | 8/2017 | Martin et al. |
| 2017/0242633 | A1 | 8/2017 | Martin et al. |
| 2017/0272231 | A1 | 9/2017 | Chen |
| 2017/0320320 | A1 | 11/2017 | Martin et al. |
| 2018/0050537 | A1 | 2/2018 | Bakker et al. |
| 2018/0147839 | A1 | 5/2018 | Ge et al. |
| 2018/0236761 | A1 | 8/2018 | Taniguchi et al. |
| 2018/0236762 | A1 | 8/2018 | Negishi et al. |
| 2018/0288276 | A1 | 10/2018 | Sato et al. |
| 2019/0061347 | A1 | 2/2019 | Bakker et al. |
| 2021/0206164 | A1 | 7/2021 | Gardner et al. |
| 2021/0213731 | A1 | 7/2021 | Linn et al. |
| 2021/0221120 | A1 | 7/2021 | Linn et al. |
| 2021/0354453 | A1 | 11/2021 | Martin et al. |
| 2021/0362494 | A1 | 11/2021 | Gardner et al. |

FOREIGN PATENT DOCUMENTS

| | | | |
|---|---|---|---|
| CN | 101092076 | A | 12/2007 |
| CN | 101522428 | A | 9/2009 |
| CN | 101574865 | A | 11/2009 |
| CN | 103358701 | A | 10/2013 |
| CN | 107073940 | A | 8/2017 |
| CN | 107206816 | A | 9/2017 |
| CO | 5570691 | A2 | 10/2005 |
| CO | 7160043 | A2 | 1/2015 |
| EP | 0972374 | A1 | 1/2000 |
| EP | 1212197 | A1 | 6/2002 |
| EP | 3892471 | A1 | 10/2021 |
| EP | 3717254 | B1 | 12/2023 |
| ES | 2788140 | A2 | 10/2020 |
| ES | 2885775 | T3 | 12/2021 |
| ES | 2892033 | T3 | 2/2022 |
| JP | 02-208052 | A | 8/1990 |
| JP | 2004-282330 | A | 10/2004 |
| JP | 2004-343468 | A | 12/2004 |
| JP | 2005-205770 | A | 8/2005 |
| JP | 2007-525342 | A | 9/2007 |
| JP | 2009-292148 | A | 12/2009 |
| JP | 2011-075387 | A | 4/2011 |
| JP | 2016-032872 | A | 3/2016 |
| JP | 2016-165822 | A | 9/2016 |
| JP | 2018-505077 | A | 2/2018 |
| KR | 10-0739789 | B1 | 7/2007 |
| KR | 10-2017-0109239 | A | 9/2017 |
| TW | 200533107 | A | 10/2005 |
| TW | 201346749 | A | 11/2013 |
| TW | 201601509 | A | 1/2016 |
| WO | 99/40702 | A1 | 8/1999 |
| WO | 01/10647 | A1 | 2/2001 |
| WO | 2016/089371 | A1 | 6/2016 |
| WO | 2016/130157 | A1 | 8/2016 |
| WO | 2017/180142 | A1 | 10/2017 |
| WO | 2018/071034 | A1 | 4/2018 |
| WO | 2018/080479 | A1 | 5/2018 |
| WO | 2018/080480 | A1 | 5/2018 |
| WO | 2018/136084 | A1 | 7/2018 |
| WO | 2018/190855 | A1 | 10/2018 |
| WO | 2019/009902 | A1 | 1/2019 |
| WO | 2019/017951 | A1 | 1/2019 |
| WO | 2019/195816 | A1 | 10/2019 |

OTHER PUBLICATIONS

"What is a Kelvin connection and when should it be used?" retrieved at http://www.calibratorsinc.com/images/applications.pdf, Dated on or before Jan. 2019, 2 pages.

Hewlett-Packard Development Company, L.P., Int. Appl. No. PCT/US2019/016735 entitled Issue 3 Determinations Responsive to Measurments filed Feb. 6, 2019 (29 pages).

* cited by examiner

INTEGRATED CIRCUIT WITH ADDRESS DRIVERS FOR FLUIDIC DIE

CROSS-REFERENCE TO RELATED APPLICATIONS

This application is a Continuation application of U.S. patent application Ser. No. 16/768,023, filed May 28, 2020, entitled "INTEGRATED CIRCUIT WITH ADDRESS DRIVERS FOR FLUIDIC DIE," which is a U.S. National Stage Application of International Application No. PCT/US2019/016818, filed Feb. 6, 2019, entitled "INTEGRATED CIRCUIT WITH ADDRESS DRIVERS FOR FLUIDIC DIE," which are incorporated herein by reference.

BACKGROUND

Some print components may include an array of nozzles and/or pumps each including a fluid chamber and a fluid actuator, where the fluid actuator may be actuated to cause displacement of fluid within the chamber. Some example fluidic dies may be printheads, where the fluid may correspond to ink or print agents. Print components include printheads for 2D and 3D printing systems and/or other high precision fluid dispense systems.

Figure 1:
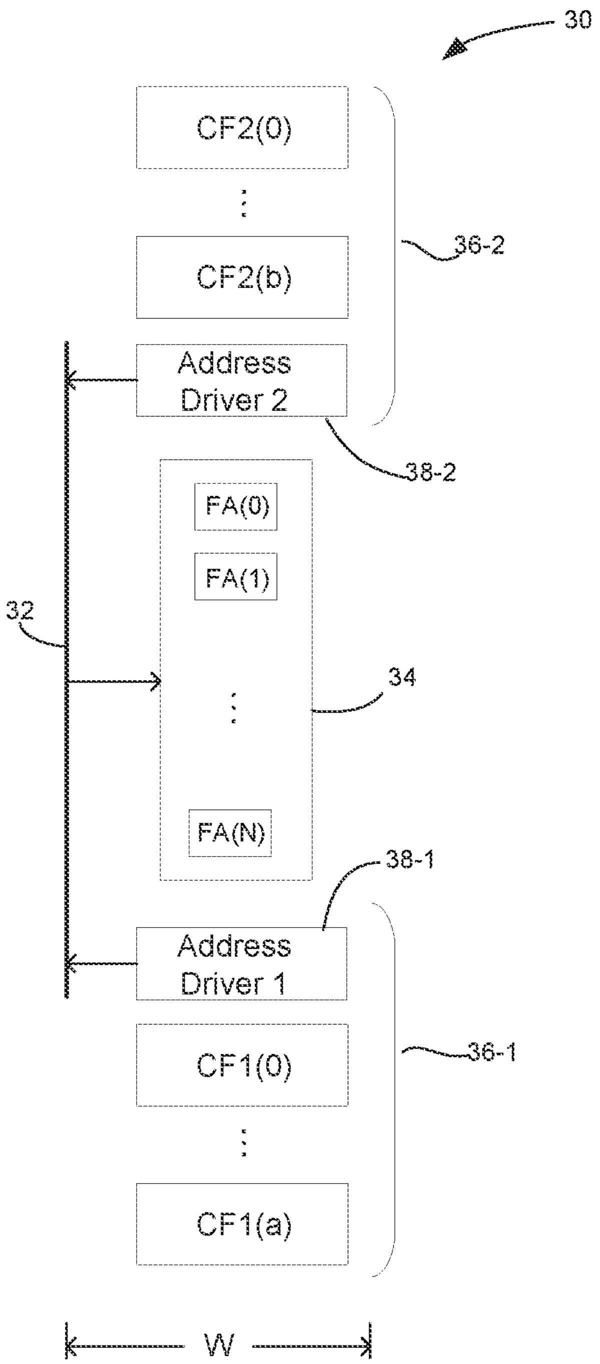
FIG. 1 is a block and schematic diagram illustrating an integrated circuit for a fluidic die, according to one example.

Throughout the drawings, identical reference numbers designate similar, but not necessarily identical, elements. The figures are not necessarily to scale, and the size of some parts may be exaggerated to more clearly illustrate the example shown. Moreover the drawings provide examples and/or implementations consistent with the description; however, the description is not limited to the examples and/or implementations provided in the drawings.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Examples of fluidic dies may include fluid actuators. The fluid actuators may include thermal resistor based actuators (e.g. for firing or recirculating fluid), piezoelectric membrane based actuators, electrostatic membrane actuators, mechanical/impact driven membrane actuators, magneto-strictive drive actuators, or other suitable devices that may cause displacement of fluid in response to electrical actuation. Fluidic dies described herein may include a plurality of fluid actuators, which may be referred to as an array of fluid actuators. An actuation may refer to singular or concurrent actuation of fluid actuators of the fluidic die to cause fluid displacement. An example of an actuation event is a fluid firing event whereby fluid is jetted through a nozzle.

In example fluidic dies, the array of fluid actuators may be arranged into sets of fluid actuators, where each such set of fluid actuators may be referred to as a "primitive" or a "firing primitive." The number of fluid actuators in a primitive may be referred to as a size of the primitive. In some examples, the fluid actuators of each primitive are addressable using a same set of actuation addresses, with each fluid actuator of a primitive corresponding to a different actuation address of the set of actuation addresses. In examples, the set of addresses are communicated to each primitive via an address bus which is shared by each primitive.

In one example, in addition to address data, each primitive receives actuation data (sometimes referred to as fire data or nozzle data) via a corresponding data line, and a fire signal (also referred to as a fire pulse) via a fire signal line. In one example, during an actuation or firing event, in response to a fire signal being present of the fire signal line, in each primitive, the fluid actuator corresponding to the address communicated via the address line will actuate (e.g., fire) based on the actuation data corresponding to the primitive.

In some cases, electrical and fluidic operating constraints of a fluidic die may limit which fluid actuators of each primitive may be actuated concurrently for a given actuation event. Primitives facilitate actuation of fluid actuator subsets that may be concurrently actuated for a given actuation event to conform to such operating constraints.

To illustrate by way of example, if a fluidic die comprises four primitives, with each primitive including eight fluid actuators (with each fluid actuator corresponding to different address of a set of addresses 0 to 7), and where electrical and fluidic constraints limit actuation to one fluid actuator per primitive, a total of four fluid actuators (one from each primitive) may be concurrently actuated for a given actuation event. For example, for a first actuation event, the respective fluid actuator of each primitive corresponding to address "0" may be actuated. For a second actuation event, the respective fluid actuator of each primitive corresponding to address "5" may be actuated. As will be appreciated, such example is provided merely for illustration purposes, with fluidic dies contemplated herein may comprise more or fewer fluid actuators per primitive and more or fewer primitives per die.

Example fluidic dies may include fluid chambers, orifices, and/or other features which may be defined by surfaces fabricated in a substrate of the fluidic die by etching, microfabrication (e.g., photolithography), micromachining processes, or other suitable processes or combinations thereof. Some example substrates may include silicon based substrates, glass based substrates, gallium arsenide based substrates, and/or other such suitable types of substrates for microfabricated devices and structures. As used herein, fluid chambers may include ejection chambers in fluidic communication with nozzle orifices from which fluid may be ejected, and fluidic channels through which fluid may be conveyed. In some examples, fluidic channels may be microfluidic channels where, as used herein, a microfluidic channel may correspond to a channel of sufficiently small size (e.g., of nanometer sized scale, micrometer sized scale, millimeter sized scale, etc.) to facilitate conveyance of small volumes of fluid (e.g., picoliter scale, nanoliter scale, microliter scale, milliliter scale, etc.).

In some examples, a fluid actuator may be arranged as part of a nozzle where, in addition to the fluid actuator, the nozzle includes an ejection chamber in fluidic communication with a nozzle orifice. The fluid actuator is positioned relative to the fluid chamber such that actuation of the fluid actuator causes displacement of fluid within the fluid chamber that may cause ejection of a fluid drop from the fluid chamber via the nozzle orifice. Accordingly, a fluid actuator arranged as part of a nozzle may sometimes be referred to as a fluid ejector or an ejecting actuator.

In some examples, a fluid actuator may be arranged as part of a pump where, in addition to the fluidic actuator, the pump includes a fluidic channel. The fluidic actuator is positioned relative to a fluidic channel such that actuation of the fluid actuator generates fluid displacement in the fluid channel (e.g., a microfluidic channel) to convey fluid within the fluidic die, such as between a fluid supply and a nozzle, for instance. An example of fluid displacement/pumping within the die is sometimes also referred to as microrecirculation. A fluid actuator arranged to convey fluid within a fluidic channel may sometimes be referred to as a non-ejecting or microrecirculation actuator. In one example nozzle, the fluid actuator may comprise a thermal actuator, where actuation of the fluid actuator (sometimes referred to as "firing") heats the fluid to form a gaseous drive bubble within the fluid chamber that may cause a fluid drop to be ejected from the nozzle orifice. As described above, fluid actuators may be arranged in arrays (such as columns, for example), where the actuators may be implemented as fluid ejectors and/or pumps, with selective operation of fluid ejectors causing fluid drop ejection and selective operation of pumps causing fluid displacement within the fluidic die. In some examples, fluid actuators of such arrays may be arranged into primitives.

Some fluidic die receive data in the form of data packets, sometimes referred to as fire pulse groups or a fire pulse group data packets, where each fire pulse group includes a head portion and a body portion. In some examples, the head portion includes configuration data for on-die configuration functions such as address data (representing an address of the set of actuation addresses) for address drivers, fire pulse data for fire pulse control circuitry, and sensor data for sensor control circuitry (e.g., selecting and configuring thermal sensors), for instance. In one example, the body portion of each fire pulse group includes actuator data that selects which nozzles corresponding to the address represented by the address data in the head portion will be actuated in response to a fire pulse.

In some fluidic dies, an address driver receives address data bits from the head portion of each fire pulse group and drives the address represented by the data bits onto an address bus, with the address bus communicating the address to the array of fluidic actuators. In addition to driving the address represented by the address bits of the fire pulse group onto the address bus, in some cases, address drivers also drive the compliment of the address onto the address bus.

Address driver circuitry consumes a relatively large amount of silicon area on a fluid die, thereby increasing a size and cost of the die. As will be described in greater detail herein, according to examples of the present disclosure, address driver circuitry is divided into multiple portions, with each portion driving a different portion of an address onto an address bus. In one example, the address driver is divided into two portions, each of the address driver circuitry driving a different portion of the actuation address onto the address bus. By dividing an address driver into multiple portions, an amount of silicon area required in at least one dimension, such as a width, thereby conserving silicon in at the least one dimension and enabling a fluidic die to be smaller in at least the one dimension.

FIG. 1 is a block and schematic diagram generally illustrating an integrated circuit 30 for an array of fluid actuators, according to one example of the present disclosure. In one example, integrated circuit 30 is part of a fluid die, which will be described in greater detail below. Integrated circuit 30 includes an address bus 32 to communicate a set of addresses to an array of fluid actuating devices 34, illustrated at fluid actuating devices FA(0) to FA(n), where fluid actuating devices FA(0) to FA(n) are addressable using the set of addresses. In one example, each fluid actuating device FA(0) to FA(n) corresponds to a different one of the addresses of the set of addresses. In one example, fluid actuating devices FA(0) to FA(n) of array 34 are arranged to form a column.

In one example, integrated circuit 30 includes a first group of configuration functions 36-1 including a first address driver 38-1 and a number of further functions illustrated as CF1(0) to CF1(*a*), and a second group of configuration functions 36-2 including a second address driver 38-2 and a number of further configuration functions illustrated as CF2(0) to CF2(*b*). In some cases, in addition to the address drives 38-1 and 38-2, the further configuration functions CF1(0) to CF1(*a*) and CF2(0) to CF2(*b*) of first and second groups of configuration functions 36-1 and 36-2 include, among others, a fire pulse control configuration function (e.g., to adjust warming, precursor, and fire pulse configurations), and sensor configuration functions (e.g., to select and control thermal sensor configurations), for example.

In operation, first address driver 38-1 drives a first portion of an address of the set of addresses onto address bus 32, and second address driver 38-2 drives a remaining portion of the address of the set of addresses onto address bus 32, where at least one of the fluid actuating devices of the array of fluid actuating devices 34 corresponds to the address driven on address bus 32 by first and second address drivers 38-1 and 38-2. By dividing an address driver into multiple portions, such as into address drivers 38-1 and 38-2, as illustrated by FIG. 1, an amount of silicon space required for address driver circuitry in at least one dimension, such as a width dimension, W, is lessened, thereby enabling a fluidic die of which integrated circuit 30 may form a part to be smaller in at least the one dimension.

Figure 2:
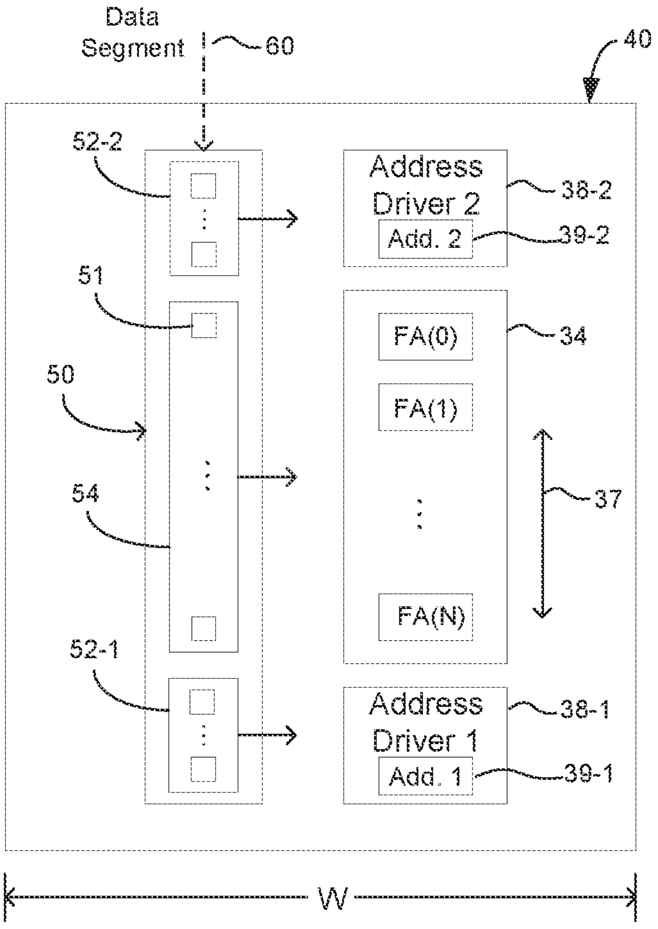
FIG. 2 is a block and schematic diagram illustrating a fluidic die, according to one example.

FIG. 2 is a block and schematic diagram illustrating an example of a fluidic die 40, in accordance with one example of the present disclosure. According to the illustrated example, in addition to the array of fluid actuators 34 which, as described above, is addressable by a set of addresses, fluidic die 40 includes first address driver 38-1, which provides a first portion of an address of the set of address based on a first set of address bits 39-1, and second address driver 38-2, which provides a second portion of an address of the set of address based on a second set of address bits 39-2. In one example, the first and second sets of address bits together provide one address of the set of addresses.

Fluidic die 40 further includes an array of memory elements 50, such as illustrated by memory element 51. According to one example, array of memory elements 50 includes a first portion of memory elements 52-1 corresponding to first address driver 38-1, a second portion of memory elements 52-2 corresponding to second address driver 38-2, and a third portion of memory elements 54 corresponding to the array of fluid actuators 34. In one example, the array of memory elements 50 is to serially load data segments 60, each data segment including a series of data bits, such that upon completion of loading of a data segment 60, memory elements of first portion of memory elements 52-1 store the first set of address bits 39-1, and memory elements of second portion of memory elements 52-2 store the second set of address bits 39-2. According examples, first and second address drivers 38-1 and 38-2 respectively receive first and second sets of address bits 39-1 and 39-2 from first and second portions of memory elements 52-1 and 52-2 to provide the first and second portions of the address of the set of addresses to the array of fluid actuators 34.

In one example, the fluid actuators of the array of fluid actuators 34 are arranged to form a column extending in a longitudinal direction 37. In one arrangement, as illustrated, first and second address drivers 38-1 and 38-2 are disposed as opposite ends of the column of fluid actuators (FAs) of array 34. In one example, memory elements 41 of the array of memory elements 40 are arranged as a chain or series of memory elements implemented as a serial-to-parallel data converter, with the series memory elements disposed to extend in the longitudinal direction 37 of the array of fluid actuators 34, such that the first and second portions of memory elements 52-1 and 52-2 are respectively disposed proximate to first and second address drivers 38-1 and 38-2, and third portion of memory elements 54 is disposed proximate to the array of fluid actuators 34.

By disposing the first and second address drivers 38-1 and 38-2 at opposite ends of the column of fluid actuators, FA(0) to FA(n), of the array of fluid actuators 34, and by arranging the array of memory elements 50 as a chain of memory elements extending in longitudinal direction 37, an amount of silicon space required in at least one dimension of fluidic die 40, such as a width dimension, W, is lessened, thereby enabling a width of fluidic die 40 to be reduced.

Figure 3:
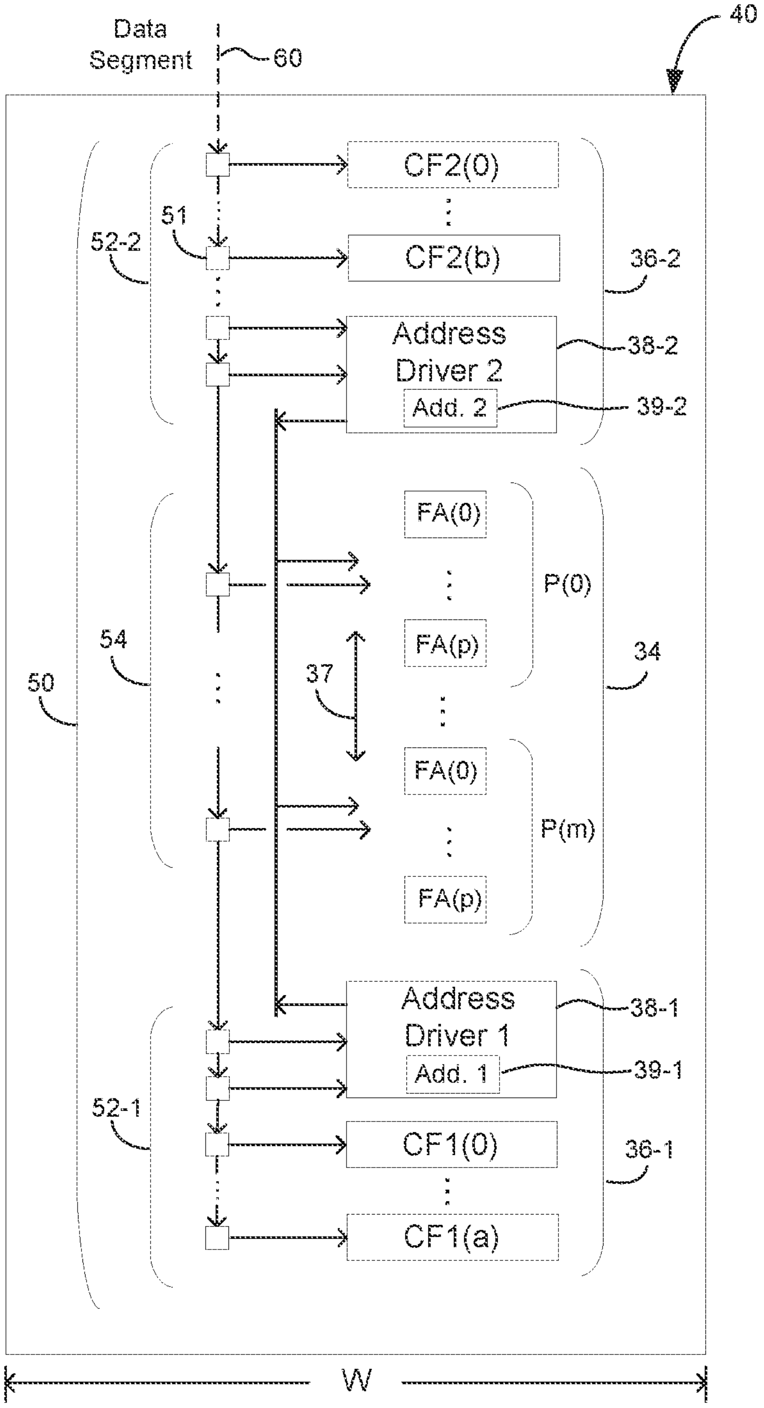
FIG. 3 is a block and schematic diagram illustrating a fluidic die, according to one example.

FIG. 3 is a block and schematic diagram illustrating an example of fluidic die 40, in accordance with the present disclosure. In one example, as illustrated the array of fluid actuators 34 is implemented as a column of fluid actuators, extending in longitudinal direction 37, with the column of fluid actuators arranged to form a number of primitives, illustrated as primitives P(0) to P(m). In example, each primitive P(0) to P(m) has a number of fluid actuators, illustrated as fluid actuators FA(0) to FA(p). In one example, each primitive P(0) to P(m) uses the same set of addresses, with each fluid actuator FA(0) to FA(p) of each primitive corresponding to a different one of the addresses of the set of addresses, such as a different addresses of a set of addresses A(0) to A(p), for instance.

First group of configuration functions 36-1 includes first address driver 38-1 and a number of additional configuration functions, CF1(0) to CF1(*a*), and second group of configuration functions 36-2 includes second address driver 38-2 and a number of additional configuration functions, CF2(0) to CF2(*b*). First address driver 38-1 drives a first portion of an address of the set of addresses on address bus 32 based on first set of address bits 39-1, and second address driver 38-2 drives a remaining portion of the address of the set of addresses based on second set of address bits 39-2, with address bus 32, in-turn, communicating the address to each primitive P(0) to P(m). In one example, as illustrated, first and second groups of configurations functions 36-1 and 36-2 are disposed in longitudinal direction 37 at opposite ends of array of fluid actuators 34.

In one example, as illustrated, the array of memory elements 50 comprises a series or chain of memory elements 51 implemented as a serial-to-parallel data converter, with first portion 52-1 of memory elements 51 corresponding to first group of configuration functions 36-1, second portion of memory elements 52-2 corresponding to second group of configuration functions 36-2, and third portion of memory elements 54 corresponding to the array of fluid actuators 34, with each memory element 51 of the third portion 54 corresponding to a different one of the primitives P(0) to P(m). In one example, the array of memory elements 50 comprises a sequential logic circuit (e.g., flip-flop arrays, latch arrays, etc.). In one example, the sequential logic circuit is adapted to function as a serial-in, parallel-out shift register.

In one example, the chain of memory elements 51 of array 50 extends in longitudinal direction 37 with first portion of memory cells 52-1 disposed proximate to first group of configuration functions 36-1, second portion of memory cells 52-2 disposed proximate to second group of configuration functions 36-2, and third group of memory cells 54 extending between first and second portions of memory cells 52-1 and 52-2 and proximate to the column of fluid actuators (FAs) of array 34.

Figure 4:
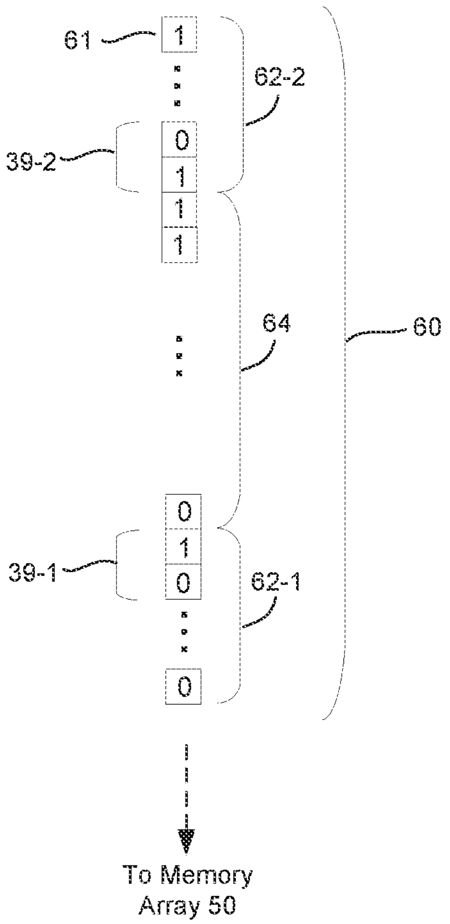
FIG. 4 is a schematic diagram generally illustrating a data segment, according to one example.

An example of the operation of fluidic die 40, such as illustrated by FIG. 3, is described below with reference to FIGS. 4 and 5. FIG. 4 is a block diagram generally illustrating an example of data segment 60 received by array of memory elements 50 of fluidic die 40. As illustrated, data segment 60 includes a series of data bits, such as illustrated by data bit 61, including a first portion of data bits 62-1, sometimes referred to as a "head", a second portion of data bits 62-2, sometimes referred to as a "tail", and a third portion of data bits 64, sometimes referred to as a "body". Together, first, second, and third portions of data bits 62-1, 62-2, and 64 are collectively referred to as a fire pulse group.

First portion of data bits 62-1 comprises data bits for first group of configuration functions 36-1, including first set of address data bits 39-1 for first address driver 38-1. Second portion of data bits 62-2 comprises data bits for second group of configuration functions 36-2, including second set of address data bits 39-2 for second address driver 38-2. Third portion of data bits 64 includes actuation data bits for array of fluid actuators 34, with each data bit 61 of third portion of data bits 64 corresponding to a different one of the primitives P(0) to P(m). The data bits of third portion of data bits 64 are sometimes referred to as primitive data.

With reference to FIG. 3 (and FIG. 2), each data segment 60 of a series of such data segments is serially loaded into the array of memory elements 50, beginning with a first bit of head portion 62-1 and ending with a last bit of tail portion 62-2. After being serially loaded or shifted into the array of memory elements 50, the data bits 61 of head portion 62-1 of data segment 60 are stored in first portion of memory elements 52-1, with the first set of address bits 39-1 corresponding to first address driver 38-1. Similarly, the data bits 61 of tail portion 62-2 of data segment 60 are stored in second portion of memory elements 52-2, with the second set of address bits 39-2 corresponding to second address driver 38-2. Data bits 61 of third portion 64 of data segment 60 are stored in third portion 54 of the array of memory elements 50.

Figure 5:
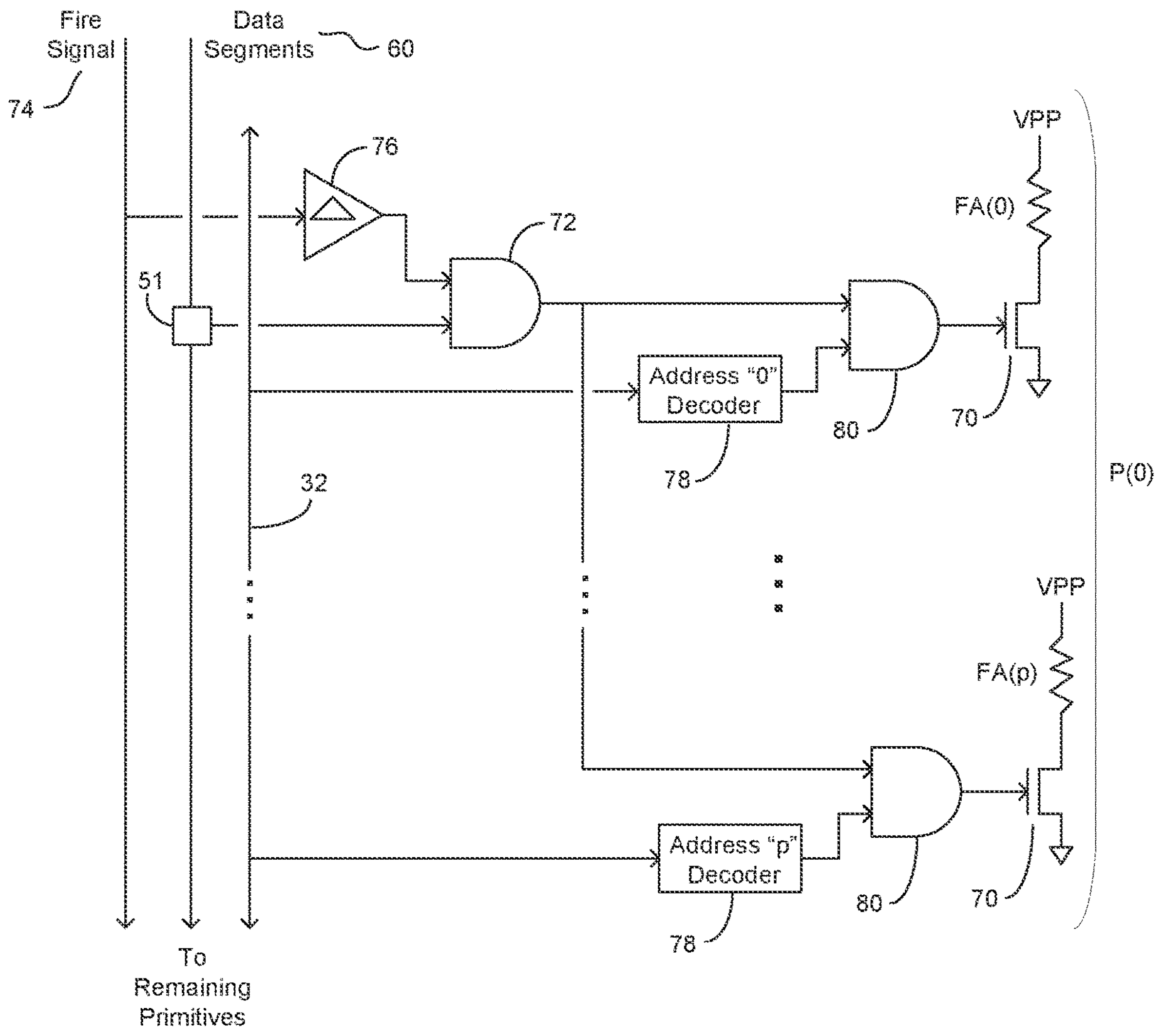
FIG. 5 is a block and schematic diagram generally illustrating portions of a primitive arrangement, according to one example.

FIG. 5 is a block and schematic diagram generally illustrating portions of a primitive arrangement, such as primitive P(0) of FIG. 3. In one example, each fluid actuator, FA, is illustrated as a thermal resistor in FIG. 5, and is connectable between a power source, VPP, and a reference potential (e.g., ground) via a corresponding controllable switch, such as illustrated by FETs 70.

According to one example, each primitive, including primitive P(0), includes an AND-gate 72 receiving, at a first input, primitive data (e.g., actuator data) for primitive P(0) from corresponding memory element 51 of third group of memory elements 54 of the array of memory elements 50. At a second input, AND-gate 72 receives a fire signal 74 (e.g., a fire pulse) which controls a duration of actuation or firing of a fluidic actuator, such as fluidic actuator FA(0). In one example, fire signal 74 is delayed by a delay element 76, with each primitive having a different delay so that the firing of fluid actuators is not simultaneous among primitives P(0) to P(m).

In one example, each fluid actuator (FA) has a corresponding address decoder 78 receiving the address driven on address bus 32 by first and second address drivers 38-1 and 38-2, and a corresponding AND-gate 80 for controlling a gate of FET 70. AND-gate 80 receives the output of corresponding address decoder 78 at a first input, and the output of AND-gate 72 at a second input. It is noted that address decoder 78 and AND-gate 80 are repeated for each fluid actuator, FA, while AND-gate 72 and delay element 76 are repeated for each primitive.

In one example, after being loaded into the array of memory elements 50, the fire pulse group data represented by the data bits 61 of head, tail, and body portions 62-1, 62-2, and 64 of data segment 60 (see FIG. 4) is processed by the corresponding groups of configuration functions 38-1 to 38-2 and primitives P(0) to P(m) to operate selected fluid actuators (FAs) to circulate fluid or eject fluid drops. For instance, with reference to FIG. 5, in one example, if the actuator data stored in memory element 51 corresponding to primitive P(0) has a logic high (e.g., "1") and a fire pulse signal 74 is present at the input of AND-gate 72, the output of AND-gate 72 is set to a logic "high". If the address driven on address bus 32 by first and second address drivers 38-1 and 38-2 in response to the sets of address bits 39-1 and 39-2 received from the corresponding memory elements of the first and second portions of memory elements 54-1 and 54-2 represents address "0", the output of Address Decoder "0" 78 is set to a logic "high". With the output of AND-gate 72 and Address Decoder "0" 78 each set to a logic "high", the output of AND-gate 80 is also set to a logic "high", thereby turning "on" corresponding FET 70 to energize fluid actuator FA(0) to displace fluid (e.g., eject a fluid drop), where a duration for which fluid actuator FA(0) is based on fire pulse signal 74.

Figure 6:
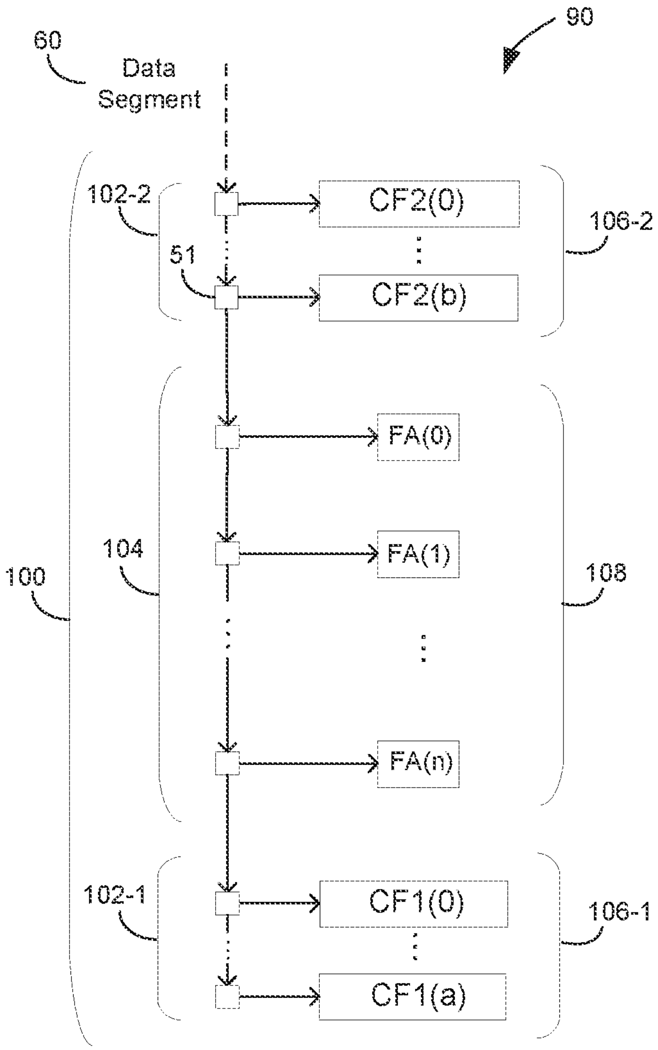
FIG. 6 is a block and schematic diagram illustrating an integrated circuit for a fluidic die, according to one example.

FIG. 6 is a block and schematic diagram generally illustrating an integrated circuit 90 for an array of fluid actuators, according to one example of the present disclosure. In one example, integrated circuit 30 is implemented as part of a fluid die. Integrated circuit 90 includes a series of memory elements 100 including a first portion of memory elements 102-1 corresponding to a first group of die configuration functions 106-1, a second portion of memory elements 102-2 corresponding to a second group of die configuration functions 106-2, and a third portion of memory elements 104 corresponding to array of fluid actuators 108, with the memory elements of the third portion of memory elements 104 extending between the first and second portions of memory elements 102-1 and 102-2.

In one example, array of fluid actuators 108 includes a number of fluid actuators indicated as fluid actuators FA(0) to F(n). In one example, first group of configuration functions 106-1 includes a number of configuration functions indicated as CF1(0) to CF1(*a*), and second group of configuration functions 106-2 includes a number of configuration functions indicated as CF2(0) to CF2(b). In examples, die configuration functions may include functions such as address drivers for driving addresses associated with the array of fluid actuators 108, fire pulse control circuitry for adjusting actuation or firing times of fluid actuators of array of fluid actuators 108 via a fire signal, and sensor control circuitry for configuring sensor circuitry (e.g., selecting and configuring thermal sensors).

In examples, the series of memory elements 100 serially loads data segments including a series of data bits, such as data segment 60 illustrated by FIG. 4, such that upon completion of loading of a data segment, the memory elements of the first portion of memory elements 102-1 store data bits for first group of die configuration functions 106-1, the second portion of memory elements 102-2 store data bits for second group of die configuration functions 106-2, and the third portion of memory elements 104 store data bits for array of fluid actuators 108.

Figure 7:
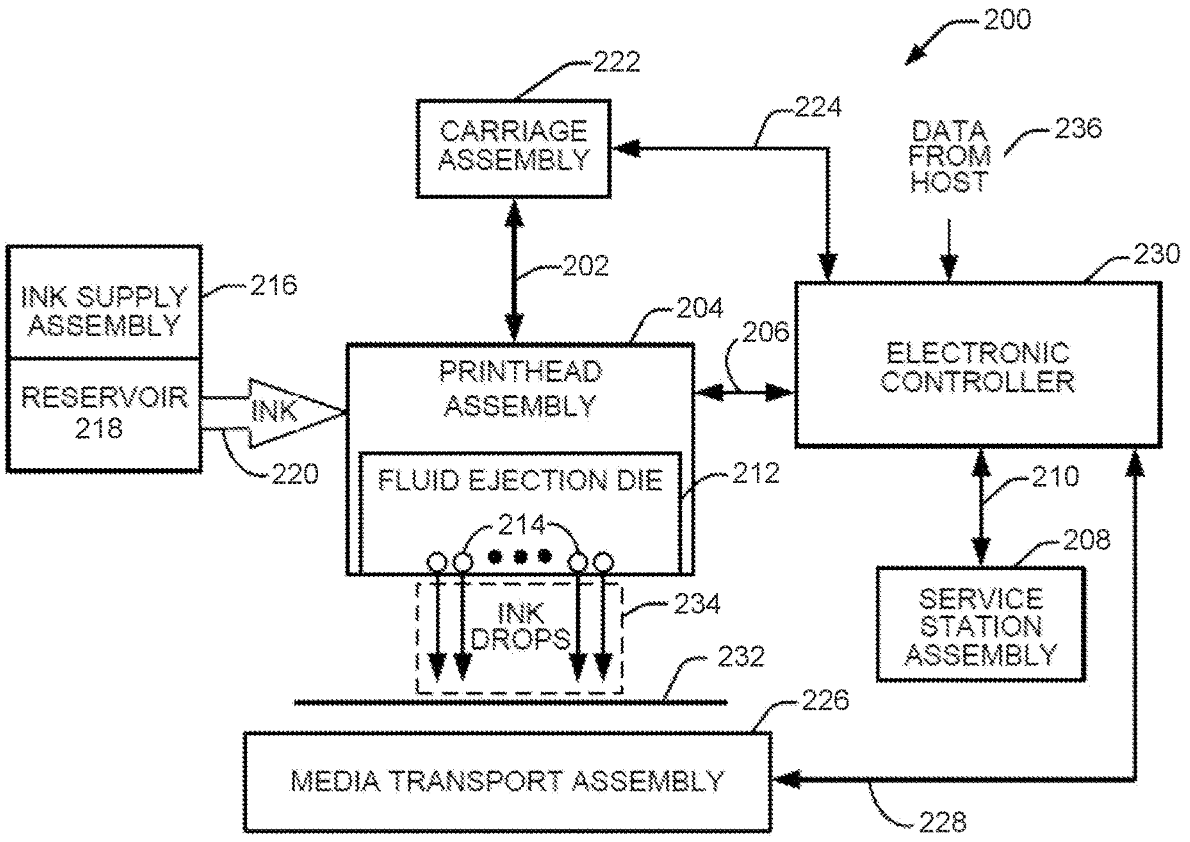
FIG. 7 is a schematic diagram illustrating a block diagram illustrating one example of a fluid ejection system.

FIG. 7 is a block diagram illustrating one example of a fluid ejection system 200. Fluid ejection system 200 includes a fluid ejection assembly, such as printhead assembly 204, and a fluid supply assembly, such as ink supply assembly 216. In the illustrated example, fluid ejection system 200 also includes a service station assembly 208, a carriage assembly 222, a print media transport assembly 226, and an electronic controller 230. While the following description provides examples of systems and assemblies for fluid handling with regard to ink, the disclosed systems and assemblies are also applicable to the handling of fluids other than ink.

Printhead assembly 204 includes at least one printhead 212 which ejects drops of ink or fluid through a plurality of orifices or nozzles 214, where printhead 212 may be implemented, in one example, using integrated circuit 30 with fluid actuators FA(0) to FA(n) implemented as nozzles 214, as previously described herein by FIG. 1, for instance. In one example, the drops are directed toward a medium, such as print media 232, so as to print onto print media 232. In one example, print media 232 includes any type of suitable sheet material, such as paper, card stock, transparencies, Mylar, fabric, and the like. In another example, print media 232 includes media for three-dimensional (3D) printing, such as a powder bed, or media for bioprinting and/or drug discovery testing, such as a reservoir or container. In one example, nozzles 214 are arranged in at least one column or array such that properly sequenced ejection of ink from nozzles 214 causes characters, symbols, and/or other graphics or images to be printed upon print media 232 as printhead assembly 204 and print media 232 are moved relative to each other.

Ink supply assembly 216 supplies ink to printhead assembly 204 and includes a reservoir 218 for storing ink. As such, in one example, ink flows from reservoir 218 to printhead assembly 204. In one example, printhead assembly 204 and ink supply assembly 216 are housed together in an inkjet or fluid-jet print cartridge or pen. In another example, ink supply assembly 216 is separate from printhead assembly 204 and supplies ink to printhead assembly 204 through an interface connection 220, such as a supply tube and/or valve.

Carriage assembly 222 positions printhead assembly 204 relative to print media transport assembly 226, and print media transport assembly 226 positions print media 232 relative to printhead assembly 204. Thus, a print zone 234 is defined adjacent to nozzles 214 in an area between printhead assembly 204 and print media 232. In one example, printhead assembly 204 is a scanning type printhead assembly such that carriage assembly 222 moves printhead assembly 204 relative to print media transport assembly 226. In another example, printhead assembly 204 is a non-scanning type printhead assembly such that carriage assembly 222 fixes printhead assembly 204 at a prescribed position relative to print media transport assembly 226.

Service station assembly 208 provides for spitting, wiping, capping, and/or priming of printhead assembly 204 to maintain the functionality of printhead assembly 204 and, more specifically, nozzles 214. For example, service station assembly 208 may include a rubber blade or wiper which is periodically passed over printhead assembly 204 to wipe and clean nozzles 214 of excess ink. In addition, service station assembly 208 may include a cap that covers printhead assembly 204 to protect nozzles 214 from drying out during periods of non-use. In addition, service station assembly 208 may include a spittoon into which printhead assembly 204 ejects ink during spits to ensure that reservoir 218 maintains an appropriate level of pressure and fluidity, and to ensure that nozzles 214 do not clog or weep. Functions of service station assembly 208 may include relative motion between service station assembly 208 and printhead assembly 204.

Electronic controller 230 communicates with printhead assembly 204 through a communication path 206, service station assembly 208 through a communication path 210, carriage assembly 222 through a communication path 224, and print media transport assembly 226 through a communication path 228. In one example, when printhead assembly 204 is mounted in carriage assembly 222, electronic controller 230 and printhead assembly 204 may communicate via carriage assembly 222 through a communication path 202. Electronic controller 230 may also communicate with ink supply assembly 216 such that, in one implementation, a new (or used) ink supply may be detected.

Electronic controller 230 receives data 236 from a host system, such as a computer, and may include memory for temporarily storing data 236. Data 236 may be sent to fluid ejection system 200 along an electronic, infrared, optical or other information transfer path. Data 236 represent, for example, a document and/or file to be printed. As such, data 236 form a print job for fluid ejection system 200 and includes at least one print job command and/or command parameter.

In one example, electronic controller 230 provides control of printhead assembly 204 including timing control for ejection of ink drops from nozzles 214. As such, electronic controller 230 defines a pattern of ejected ink drops which form characters, symbols, and/or other graphics or images on print media 232. Timing control and, therefore, the pattern of ejected ink drops, is determined by the print job commands and/or command parameters. In one example, logic and drive circuitry forming a portion of electronic controller 230 is located on printhead assembly 204. In another example, logic and drive circuitry forming a portion of electronic controller 230 is located off printhead assembly 204. In another example, logic and drive circuitry forming a portion of electronic controller 230 is located off printhead assembly 204. In one example, data segments 33-1 to **33-*n*, intermittent clock signal 35, fire signal 72, and mode signal 79 may be provided to print component 30 by electronic controller 230, where electronic controller 230 may be remote from print component 30**.

Figure 8:
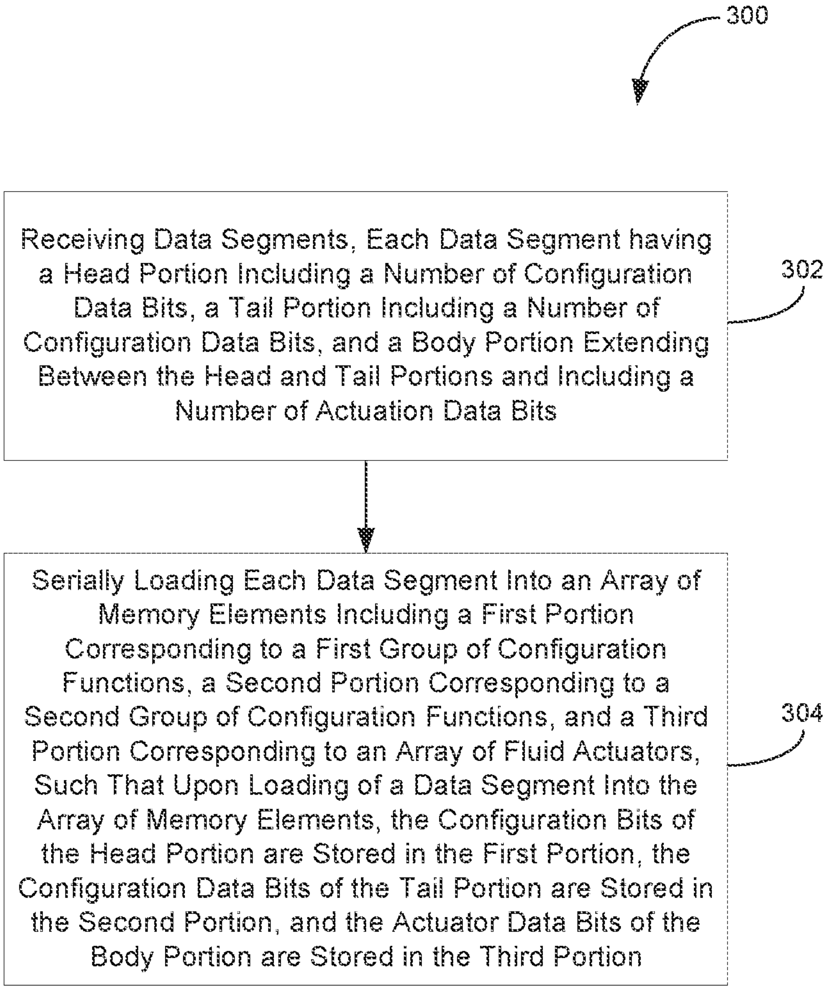
FIG. 8 is a flow diagram illustrating a method of operating a fluidic die, according to one example.

FIG. 8 is a flow diagram generally illustrating a method 300 of operating a fluidic die, according to one example of the present disclosure, such as fluidic die 40 of FIG. 3, for instance. At 302, method 300 includes receiving data segments, each data segment having a head portion including a number of configuration data bits, a tail portion including a number of configuration data bits, and a body portion extending between the head portion and tail portion and including a number of actuation data bits, such as data segment 60 of FIG. 4 including a head portion 62-1, a tail portion 62-2, and a body portion 64.

At 304, method 300 includes serially loading each data segment into an array of memory elements including a first portion of memory elements corresponding to a first group of configuration functions, a second portion of memory elements corresponding to a second group of configuration functions, and a third portion of memory elements corresponding to an array of fluid actuators, such that upon loading of a data segment into the array of memory elements, the configuration bits of the head portion are stored in the first portion of memory elements, the configuration data bits of the tail portion of memory elements are stored in the second portion of memory elements, and the actuator data bits of the body portion are stored in the third portion of memory elements, such serially loading data segment 60 into array of memory elements 50 with first portion of memory elements 52-1 corresponding to a first group of configuration functions 36-1, second portion of memory elements 52-2 corresponding to a second group of configuration functions 36-2, and third portion of memory elements 54 corresponding to the array of fluid actuating devices 34.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A fluidic die comprising:

an array of fluid actuating devices addressable by a set of addresses;

an array of memory elements including a first portion to receive a first set of address bits representative of a first portion of an address of the set of addresses, and a second portion to receive a second set of address bits representative of a second portion of the address of the set of addresses;

a first address driver to provide a first portion of the address of the set of addresses based on the first set of address bits received by the first portion of memory elements; and a second address driver to provide a remaining portion of the address of the set of addresses based on a second set of address bits received by the second portion of memory elements, wherein the array of fluid actuating devices is arranged as a column extending longitudinally between the first address driver and the second address driver, wherein the fluid actuators of the column of fluid actuators are arranged to form a number of primitives, the fluid actuators of each primitive addressable by the set of addresses with each fluid actuator corresponding to a different of the addresses of the set of addresses, where each memory element of a third portion of memory elements corresponds to a different one of the primitives.

2. The fluidic die of claim 1, further including:

an address bus to communicate the set of addresses, the address bus extending longitudinally between a first end and a second end, the first address driver disposed proximate to the first end and the second address driver disposed proximate to the second end, the first and second address drivers together to drive the address of the set of addresses on the address bus.

3. The fluidic die of claim 1, the array of memory elements comprising a chain of memory elements to function as a serial-to-parallel data converter, the chain of memory elements including the first and second portions of memory elements and the third portion of memory elements extending between the first and second portions of memory elements.

4. The fluidic die of claim 3, the first portion of memory elements disposed proximate to the first address driver, the second portion of memory elements disposed proximate to the second address driver, and the third portion of memory elements corresponding to and disposed proximate to the array of fluid actuating devices.

5. The fluidic die of claim 3, the array of memory elements to serially load data segments such that upon completion of loading a data segment, the first portion of memory elements stores the first set of address bits, the second portion of memory elements stores the second set of address bits, and the third portion of memory elements stores actuation data to actuate the array of fluid actuating devices.

6. A printhead cartridge comprising:

a fluidic die including:

a column of fluid actuating devices addressable by a set of addresses;

a first address driver to provide a first portion of an address of the set of addresses based on a first set of address bits;

a second address driver to provide a remaining portion of the address of the set of addresses based on a second set of address bits, wherein the column of fluid actuating devices extends longitudinally between the first address driver and second address driver; and an array of memory elements to provide the first set of address bits to the first address driver and the second set of address bits to the second address driver, the array of memory elements including a first portion of memory elements corresponding to the first address driver, and a second portion of memory elements corresponding to the second address driver, the array of memory elements to serially load data segments such that upon completion of loading a data segment the memory elements of the first portion store the first set of address bits and the memory elements of the second portion store the second set of address bits, wherein the fluid actuators of the column of fluid actuators are arranged to form a number of primitives, the fluid actuators of each primitive addressable by the set of addresses with each fluid actuator corresponding to a different of the addresses of the set of addresses, where each memory element of a third portion of memory elements corresponds to a different one of the primitives.

7. The printhead cartridge of claim 6, further including:

a reservoir to supply fluid to the column of fluid actuating devices.

8. The printhead cartridge of claim 6, the array of memory elements including the third portion of memory elements corresponding to the column of fluid actuating devices.

9. The printhead cartridge of claim 6, the array of memory elements comprising a chain of memory elements to function as a serial-to-parallel data converted, the chain of memory elements extending in parallel with the column of fluid actuating devices with the first portion of memory elements disposed proximate to the first address driver, the second portion of memory elements disposed proximate to the second address driver, and the third portion of memory elements extending between the first and second portions of memory elements and disposed proximate to the column of fluid actuating devices.

10. A fluidic die, comprising:

an address bus;

an array of fluid ejection devices addressable by a set of addresses received via the address bus;

an array of memory elements including a first portion of memory elements to receive a first set of address bits representative of a first portion of an address of the set of addresses, and a second portion of memory elements to receive a second set of address bits representative of a remaining portion of the address of the set of addresses;

a first address driver to drive the first portion of the address of the set of addresses on the address bus based on the first set of address bits stored by the first portion of memory elements; and a second address driver to drive the remaining portion of the address of the set of addresses on the address bus based on the second set of address bits stored by the second portion of memory elements, wherein the array of fluid actuating devices are arranged as a column extending longitudinally between the first address driver and the second address driver, wherein the fluid actuators of the column of fluid actuators are arranged to form a number of primitives, the fluid actuators of each primitive addressable by the set of addresses with each fluid actuator corresponding to a different of the addresses of the set of addresses, where each memory element of a third portion of memory elements corresponds to a different one of the primitives.

11. The fluidic die of claim 10, the first address driver disposed proximate to a first end of the address bus and the second address driver disposed proximate to a second end of the address bus opposite the first end.

12. The fluidic die of claim 10, the memory array comprising a chain of memory elements to function as a serial-to-parallel data converter, the chain of memory elements including the first and second portions of memory elements and the third portion of memory elements extending between the first and second portions of memory elements.

13. The fluidic die of claim 12, the first portion of memory elements disposed proximate to the first address driver, the second portion of memory elements disposed proximate to the second address driver, and the third portion of memory elements corresponding to and disposed proximate to the array of fluid actuating devices.

14. The fluidic die of claim 12, the memory array to serially load data segments such that upon completion of loading a data segment, the first portion of memory elements stores the first set of address bits, the second portion of memory elements stores the second set of address bits, and the third portion of memory elements stores actuation data to actuate the array of fluid actuating devices.

* * * * *